Jan. 30, 1951  F. J. DITTER  2,539,817
AIRCRAFT SKI
Filed Oct. 31, 1946
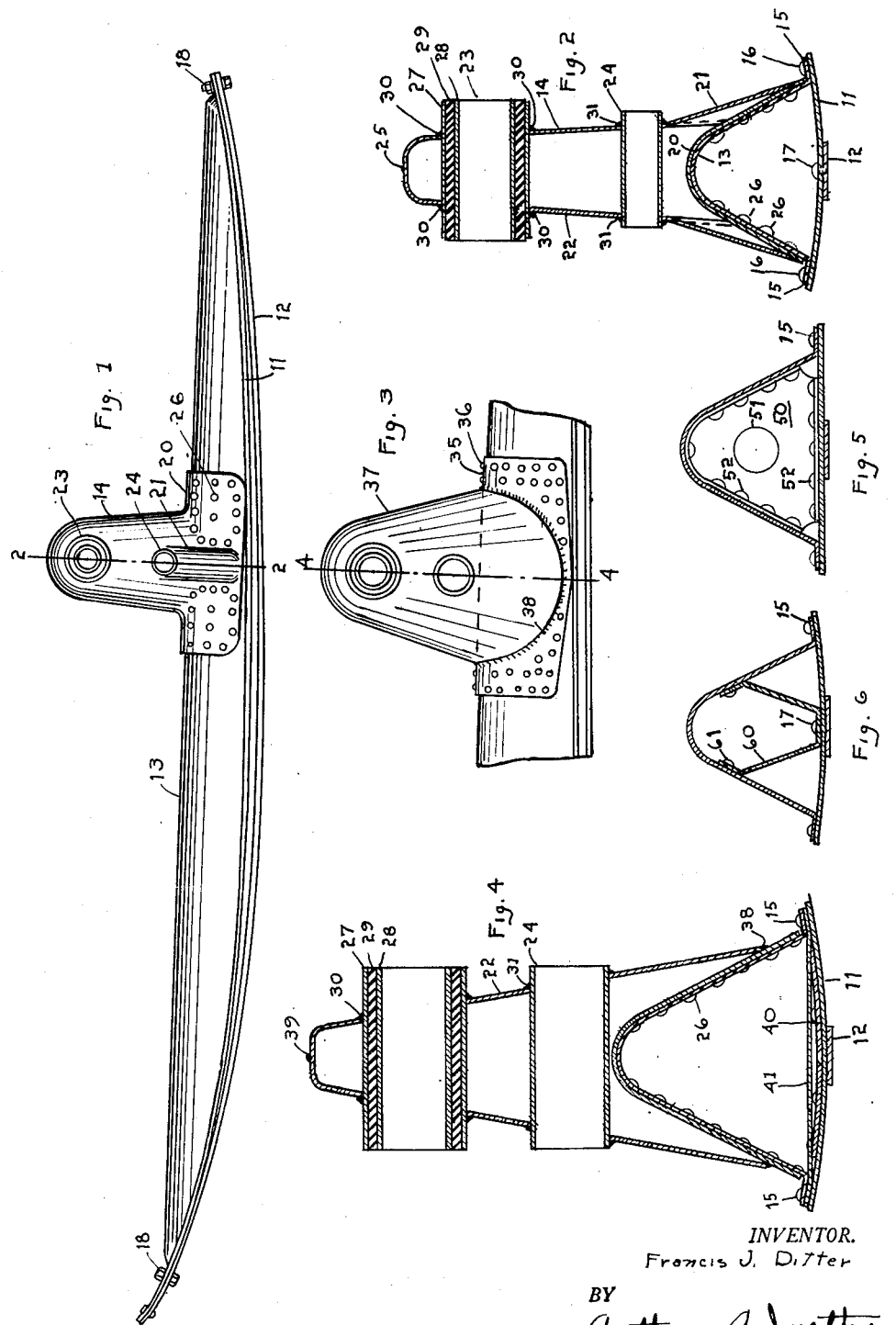
INVENTOR.
Francis J. Ditter
BY
Anthony A Juettner
ATTY.

Patented Jan. 30, 1951

2,539,817

UNITED STATES PATENT OFFICE 2,539,817

AIRCRAFT SKI

Francis J. Ditter, Minneapolis, Minn.

Application October 31, 1946, Serial No. 706,883

12 Claims. (Cl. 280—28)

The present invention relates to ski landing gear for aircraft and constitutes an improvement over the ski landing gear disclosed in my Patent Number 1,833,210 granted November 24, 1931.

Aircraft skis must satisfy a large number of requirements. Primarily they must be sturdy and light in weight. They must possess suitable aerodynamic characteristics such that they do not materially contribute to the drag of the aircraft in flight. They must possess various structural characteristics which aid taxiing, maneuvering, and actual landings and take-offs. They should possess a certain degree of flexibility so as to at least partially absorb the shock of taxiing, take-offs, and landings.

The skis heretofore available have been lacking in many of the desirable features previously described. The present invention provides skis of a novel design which embodies the above desirable features. The present skis provide maximum strength at a minimum weight. Their aerodynamic characteristics reduce drag to a minimum. They are provided with a compoundly curved ski surface which makes for ease of turning, automatic alignment with the landing surface, and less actual area of contact with the landing surface. The contour of the bottom and the position of the support pedestal give the skis a tendency to climb out of deep snow during landing or takeoff, whereas the skis during flight assume a low-drag attitude. Likewise, various features of the construction provide a flexibility which absorbs part of the shock and reduces the shock load on the aircraft and its landing gear.

It is, therefore, an object of the present invention to provide a novel aircraft ski structure which provides great strength per unit weight while at the same time possessing excellent taxiing and flight characteristics.

It is another object of the present invention to provide a novel aircraft ski structure which is characterized by high maneuverability, automatic alignment with the landing surface, reduced area of contact with the landing surface, and a tendency to climb out of deep snow.

It is a further object of the invention to provide an aircraft ski structure which provides structural flexibility so as to afford smooth taxiing, take-offs, and landings over packed snow or ice.

These and other objects of the invention will be more fully apparent from the following description of the invention, with particular reference to the drawings, in which Figure 1 represents a side elevation of a typical aircraft ski embodying the present invention;

Fig. 2 is a cross-section taken along the line 2—2 of Figure 1;

Fig. 3 is a partial side elevation of a further embodiment of the invention;

Fig. 4 is a cross-section taken on the line 4—4 of Fig. 3;

Figs. 5 and 6 are partial cross-sections of other embodiments of the invention.

With particular reference to Figs. 1 and 2, the ski is composed principally of a base shoe 11 carrying a runner 12, a channel member 13, which is illustrated in these figures as being generally V-shaped, and a pedestal generally indicated as 14.

As shown in the drawings, the base shoe is curved continuously in a longitudinal direction and is likewise curved in a transverse direction. This provides maximum strength and at the same time provides suitable taxiing characteristics, as will be pointed out more fully hereinafter. The channel member extends substantially the entire length of the ski, the base of the channel being substantially a straight line, while the branches thereof vary in length to fit the contour of the base shoe as is clearly shown in Figure 1. The branches of the channel are bent outward to provide flanges 15 which are adjacent to the base shoe and suitably fastened thereto; for example, by the use of rivets 16 as shown in Fig. 2. The runner is fastened to the base plate in a suitable manner; for example, by the use of rivets 17 and terminally by means of bolts 18 to which conventional rigging means may be fastened.

The pedestal is composed of a saddle portion 20 which generally conforms to the shape of the channel member and is superimposed thereon. In order to increase the strength of the pedestal, the saddle has an embossed rib 21 which reinforces the saddle and the pedestal at points immediately beneath the point at which the load of the aircraft is applied to the ski. The upright portion of the pedestal is composed of a hollow member 22 which is provided with holes into which the aircraft support bushings 23 are fastened. The pedestal is likewise provided with a bushing 24, the purpose of which will be explained more fully hereinafter.

The pedestal illustrated in Figs. 1 and 2 may very conveniently be formed by a pair of identical stampings, each comprising one side of a pedestal, and these stampings may be welded together longitudinally as shown in Fig. 2 by means of weld 25 to provide the above described pedestal. The pedestal is suitably fastened to the channel member, for example by means of rivets 26. The pedestal is preferably of small dimension in the direction transverse the ski. In this way it is possible to provide a ski which may be applied to a number of different aircraft by means of simple adapter bushings which fit inside the support bushings 23.

The aircraft support bushings 23 may be composed of an outer sleeve 27 and an inner sleeve 28, between which is disposed a suitable resilient sleeve 29 which preferably is of rubber. The outer sleeve 27 may be welded at point 30 to fasten the sleeve in the pedestal. The inner sleeve may be held in the structure by means of a friction fit with the rubber bushing 29. The aircraft support bushing 23 is shown in the drawings in a horizontal position. This position is suitable for aircraft having landing shock gear which maintains the wheel shaft in a horizontal plane in all positions of the shock gear. Skis having the aircraft support bushing disposed at a slight angle are particularly suitable for aircraft having landing shock gear which does not maintain the wheel shaft horizontal. This slight angle permits the skis to ride on the center of the base shoe when the load of the aircraft is on the skis.

Stub shaft bushing 24 may be suitably fastened in the pedestal as by welding at points 31.

In use the aircraft ski is placed on the axle shaft from which the ordinary wheel landing gear has been removed. It may be resiliently rigged to the aircraft in any of the conventional manners heretofore employed. The stub shaft bushing 24 provides a means for attaching a landing wheel to the aircraft at the same time that the skis are attached. This is of value in moving the aircraft; for example from a hanger to a snow or ice-covered runway. For this purpose a stub shaft is fastened in this stub shaft bushing and the regular aircraft wheel fastened to the stub shaft. The aircraft wheel extends below the level of the ski and accordingly carries the weight of the airplane when so attached. With many light aircraft, the wheel may be attached to the stub shaft without undue difficulty, as these light aircraft may be tipped sufficiently by hand to enable the aircraft wheel to be put in place. The wheel can be readily removed after the aircraft has been moved to a position where it can move on the skis.

Figs. 3 and 4 illustrate an embodiment of the invention which is different in several respects. The pedestal employed in this embodiment is composed of a saddle portion 35 which is riveted to the inverted V section by means of rivets 36. The upright portion of the pedestal is composed of a separate piece 37 suitably fastened, as for example, by welding to the saddle along line 38. In this embodiment of the invention, the saddle may be formed of a single piece stamped to follow the shape of the V-shaped channel member. The upright portion of the pedestal may be formed of two parts which are welded together longitudinally as shown by point 39 in Fig. 4. The remainder of the pedestal structure, the aircraft support bushing, and the stub shaft bushing are essentially the same as in the previously described figures. The shoe structure of this embodiment is, however, considerably different. It contains the same general type of shoe 11 and runner. However, in order to support heavier loads, a particular reinforcing structure has been employed. This is composed of an auxiliary plate 40 which lies intermediate the open ends of the V and is suitably riveted to the base shoe. Longitudinally this auxiliary plate extends only under the area adjacent the pedestal and assists in distributing the heavy loads which are placed upon the ski at this point. This embodiment of the invention also employs a light-weight tension member 41 which extends as a chord across the base shoe and is fastened in the assembly by means of the rivet 15. This tension member likewise extends along the portion of the length of the ski which is adjacent the pedestal.

The embodiment illustrated in Figs. 3 and 4 is particularly adapted to heavy aircraft in which the load on the ski is materially increased. The auxiliary plate reinforces the curved surface at the points of the greatest load and resists the deformation of the curved surface. Tension member 41 likewise resists deformation of the base shoe. These additional structural features are particularly important since skis intended for heavy aircraft usually have a base shoe which is substantially wider than that employed for light-weight aircraft, and accordingly the distance between the open ends of the V is materially greater, thereby presenting a larger area for deformation.

As further embodiments of the invention, it is possible to employ the tension member 41 or the auxiliary plate 40 separately. These may be employed in skis for use on aircraft which do not require the combination of these reinforcing members.

The embodiment illustrated in Fig. 5 is shown with a base shoe which is not curved transversely, but which is curved longitudinally. This type of base shoe is particularly adapted for large sizes which are difficult to shape with a compound curve. Moreover where the ski is of excessive width, a compound curve brings the sides of the ski up to a point where they are less efficient. In Fig. 5 there is shown an internal support diaphragm 50 which generally conforms to the shape of the cross-section of the ski. The diaphragm may be provided with a hole in the center 51 which reduces weight. The diaphragm may be fastened to the channel and base shoe by means of rivets which pass through flanges in the diaphragm. These diaphragms are spaced longitudinally along the ski, being closer together near the pedestal.

In Fig. 6 there is illustrated a further embodiment in which a longitudinal support member 60 is disposed inside the channel. This longitudinal support member may take a variety of shapes. As shown, it is generally channel-shaped in cross-section and is fastened to the base shoe and to the inverted channel by means of rivets 17 and 61.

With reference to the assembled ski, it should be pointed out that the ski base shoe is a substantially continuous curve from one end to the other. The pedestal is attached to the ski assembly somewhat to the rear of center. There is a tendency therefore, in taxiing, take-offs, and landings for the front of the ski to rise up out of the snow and raise the plane up onto the crest of the snow. When the plane is in the air, the ski assumes a substantially horizontal position, thus presenting only a slight frontal area for drag. It is to be noted further that on a hard-packed landing surface only a small area of the ski, that beneath the pedestal, contacts the landing surface. This gives the ski a pivot point directly beneath the pedestal providing good maneuverability for short turns. Moreover, there is less tendency for the skis to freeze in firmly. If they should freeze in slightly, it is a simple matter to free them by rocking the plane by means of the control surfaces. It is to be understood that statements of reduced area of contact are with reference to firmly packed landing surfaces. In loose snow, the area of contact is greater and the weight is more evenly distributed over the surface of the ski. Nevertheless, the curved surface of the shoe provides suitable maneuverability.

The compound curved bottom provides flexibility to absorb shocks. When a load is applied to the curved bottom, there is a tendency for the bottom to deflect, spreading the channel member and absorbing the shock. When the greatest load is relieved, the channel member and the bottom assume their original shapes. This action provides smooth taxiing, take-offs, and landings and assists the normal shock gear in carrying the load.

While the drawings have illustrated rivets as the means for attaching the base shoe and the pedestal to the channel member and welding as the means for uniting the two halves of the pedestal and for attaching the aircraft support bushing and stub shaft bushing to the pedestal, it will be apparent that these means are illustrative only and that any means such as riveting, welding, spotwelding, bolting and the like may be used at these points. It will also be apparent that the pedestal may be cast as a single unit. Similarly it is possible to form the channel member and pedestal integrally. For example, one-half of the channel and the pedestal may be a single stamping and two such halves could be united longitudinally to form the combination channel and pedestal. Similarly, while the channel member may be as shown, a generally V-shaped member, other channels in general, such as rounded or square cornered U or V-shaped channel members may be used.

While light weight metals such as aluminum or magnesium are preferred as material of construction, other metals, either ferrous or non-ferrous, and even plastics, may be employed.

While various modifications of the invention have been described, it is to be understood that the same is not limited thereto, but may be varied within the scope of the following claims.

I claim as my invention:

1. An aircraft landing ski comprising a transversely curved base shoe, an inverted, substantially V-shaped channel member extending substantially from one end of said base shoe to the other, a tension member overlying said base shoe and extending from one side of the channel member to the other, the branches of said channel member being attached to said base shoe and said tension member near the periphery thereof and an upright mounting pedestal on said channel member.

2. An aircraft ski comprising a base shoe composed of a resilient sheet, said shoe being curved longitudinally and laterally substantially continuously throughout the length and width thereof, an inverted substantially V-shaped channel member, said channel member having flanges extending laterally outwardly from the ends of the arms of the V, said channel member being superimposed on said base shoe and attached thereto along the periphery of the base shoe by means of said flanges, and an upright mounting pedestal between the ends of said ski.

3. An aircraft ski according to claim 2 in which the base of the V forms a substantially straight line longitudinally of the ski, and the depth of the channel varies according to the curvature of the base shoe.

4. An aircraft ski according to claim 2 in which the mounting pedestal has a saddle portion mounted on said inverted channel.

5. An aircraft ski according to claim 2 in which a runner is attached longitudinally to the base shoe in the approximate middle thereof.

6. An aircraft landing ski comprising a ski assembly, said assembly being composed of a base shoe and an inverted channel member having flanges extending laterally outwardly from the arms of the channel, said channel overlying the base shoe and being attached thereto by means of said flanges, and an upright mounting pedestal attached to said ski assembly between the ends thereof, the base of the channel being a substantially straight line longitudinally of the ski.

7. An aircraft landing ski according to claim 6 in which the base shoe is curved longitudinally substantially continuously from the front to a point at least as far back as the mounting pedestal.

8. An aircraft landing ski according to claim 6 in which the channel is substantially V shaped.

9. An aircraft landing ski according to claim 6 in which a runner is attached longitudinally to said base shoe in approximately the middle thereof.

10. An aircraft landing ski comprising a ski assembly, said assembly being composed of a base shoe, and an inverted channel member secured to said base shoe, and an upright mounting pedestal attached to said ski assembly between the ends thereof, means on said pedestal for attaching said ski to the wheel shaft of an aircraft landing gear from which the wheel has been removed, and additional means on the pedestal located below said first mentioned means for attaching a wheel stub shaft to said pedestal, said base shoe being curved longitudinally substantially continuously from the front to a point at least as far back as the mounting pedestal.

11. An aircraft landing ski according to claim 6 in which there is provided a longitudinal support member inside the channel attached to the channel and to the base shoe.

12. An aircraft landing ski according to claim 6 in which there is provided a plurality of diaphragms extending across the channel member and being attached thereto and to the base shoe.

FRANCIS J. DITTER.

REFERENCES CITED

The following references are of record in the file of this patent:

UNITED STATES PATENTS

| Number | Name | Date |
| --- | --- | --- |
| 394,382 | Meyer | Dec. 11, 1888 |
| 951,692 | Melby | Mar. 8, 1910 |
| 1,287,452 | Saehr | Dec. 10, 1918 |
| 1,714,375 | Junkers | May 21, 1929 |
| 1,817,901 | Procofieff-Seversky | Aug. 4, 1931 |
| 1,833,210 | Ditter | Nov. 24, 1931 |
| 2,095,951 | Andrus | Oct. 19, 1937 |
| 2,404,402 | Porter | July 23, 1946 |